(12) United States Patent
Park (10) Patent No.: US 9,869,760 B2
(45) Date of Patent: Jan. 16, 2018

(54) SYSTEM AND METHOD FOR RECOGNIZING A MOTION BY ANALYZING A RADIO SIGNAL

(71) Applicant: Hyundai Motor Company, Seoul (KR)

(72) Inventor: Un Kyu Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 478 days.

(21) Appl. No.: 14/569,640

(22) Filed: Dec. 13, 2014

(65) Prior Publication Data

US 2016/0084951 A1    Mar. 24, 2016

(30) Foreign Application Priority Data

Sep. 18, 2014  (KR) .................. 10-2014-0124552

(51) Int. Cl.
*G01S 13/04* (2006.01)
*G01S 7/41* (2006.01)
*G01S 13/00* (2006.01)
*G01S 13/56* (2006.01)
*G06F 3/01* (2006.01)

(52) U.S. Cl.
CPC ............. *G01S 13/04* (2013.01); *G01S 7/415* (2013.01); *G01S 13/003* (2013.01); *G01S 13/56* (2013.01); *G06F 3/017* (2013.01)

(58) Field of Classification Search
CPC .......... G01S 13/04; G01S 7/415; G01S 13/56; G01S 13/003; G06F 3/017
See application file for complete search history.

(56) References Cited

U.S. PATENT DOCUMENTS

| 9,625,267 | B2 * | 4/2017 | Jung .................... G01C 21/362 |
| 9,646,200 | B2 * | 5/2017 | Archibald .......... G06K 9/00355 |
| 9,646,439 | B2 * | 5/2017 | Ricci .................. G07C 9/00158 |
| 9,649,938 | B2 * | 5/2017 | Schlittenbauer ....... B60K 37/06 |
| 2007/0091292 | A1 | 4/2007 | Cho et al. |
| 2009/0278915 | A1 | 11/2009 | Kramer et al. |

(Continued)

FOREIGN PATENT DOCUMENTS

| CN | 103631157 A * | 3/2014 | |
| DE | 102011075725 A1 * | 11/2012 | ............. G01S 7/412 |

(Continued)

OTHER PUBLICATIONS

H. C. Ting, S. S. Chen, K. Labille, Y. W. Tsai, Y. H. Chen and S. J. Ruan, "Intelligent applications design in automotive infortainment systems," 2012 IEEE Asia Pacific Conference on Circuits and Systems, Kaohsiung, 2012, pp. 376-379.*

(Continued)

*Primary Examiner* — John B Sotomayor
(74) *Attorney, Agent, or Firm* — Mintz Levin Cohn Ferris Glovsky and Popeo, P.C.; Peter F. Corless (57) ABSTRACT

A system for recognizing motion by analyzing a radio signal includes: a radio signal transmitter configured to transmit a radio signal; a radio signal receiver configured to receive the transmitted radio signal; and a motion recognition processing device configured to: i) analyze the received radio signal, ii) extract and classify a gesture from the analyzed radio signal, iii) recognize the extracted and classified gesture, and iv) perform vehicle device control based on the recognized gesture.

8 Claims, 6 Drawing Sheets

(56) References Cited

U.S. PATENT DOCUMENTS

| | | | | |
|---|---|---|---|---|
| 2012/0018989 | A1* | 1/2012 | Breed | B60R 21/01516 |
| | | | | 280/735 |
| 2012/0032899 | A1* | 2/2012 | Waeller | G01C 21/3664 |
| | | | | 345/173 |
| 2014/0306834 | A1* | 10/2014 | Ricci | B60Q 1/00 |
| | | | | 340/902 |
| 2015/0077272 | A1* | 3/2015 | Pisz | B60K 37/06 |
| | | | | 340/905 |
| 2016/0137126 | A1* | 5/2016 | Fursich | B60R 1/00 |
| | | | | 348/38 |
| 2016/0200276 | A1* | 7/2016 | Diewald | G01S 7/354 |
| | | | | 342/28 |
| 2016/0368382 | A1* | 12/2016 | Schlittenbauer | B60K 37/06 |

FOREIGN PATENT DOCUMENTS

| | | | |
|---|---|---|---|
| DE | 102013225744 A1 * | 6/2014 | G06K 9/34 |
| KR | 2007-0031658 A | 3/2007 | |
| KR | 10-2007-006107 A | 6/2007 | |
| KR | 10-2007-0061078 A | 6/2007 | |
| KR | 10-2010-013772 A | 12/2010 | |
| KR | 20100132772 A | 12/2010 | |
| KR | 10-2011-0022057 A | 3/2011 | |
| KR | 10-2011-0064106 A | 6/2011 | |
| KR | 10-2012-0024247 A | 3/2012 | |
| KR | 101260053 B1 * | 5/2013 | |

OTHER PUBLICATIONS

E. Ohn-Bar and M. M. Trivedi, "Hand Gesture Recognition in Real Time for Automotive Interfaces: A Multimodal Vision-Based Approach and Evaluations," in IEEE Transactions on Intelligent Transportation Systems, vol. 15, No. 6, pp. 2368-2377, Dec. 2014.*
B. Ionescu et al., "Using a NIR Camera for Car Gesture Control," in IEEE Latin America Transactions, vol. 12, No. 3, pp. 520-523, May 2014.*

* cited by examiner

SYSTEM AND METHOD FOR RECOGNIZING A MOTION BY ANALYZING A RADIO SIGNAL

CROSS-REFERENCE TO RELATED APPLICATION

This application claims the benefit of and priority to Korean Patent Application No. 10-2014-0124552, filed on Sep. 18, 2014 in the Korean Intellectual Property Office, the disclosure of which is incorporated herein in its entirety by reference.

BACKGROUND

Technical Field

The present disclosure relates to a system and method for recognizing a motion by analyzing a radio signal, and more particularly, technology capable of recognizing motion of a user using a radio signal generated in a vehicle.

Description of the Related Art

Recently, technological developments associated with electronic terminal devices have rapidly increased along with the generalization of the various media in digital form. Also, the variety of input devices for controlling electronic terminal devices has risen.

With respect to general consumer electronic devices, such as a TV, a video player, a DVD player and an audio, and the like, a remote controller (alternatively referred to as "remocon") can be used as a general control means. However, due to the increase in the type and number of such consumer electronic devices, the number of remocons for controlling each of the consumer electronic devices has also proportionally increased. As a result, in order to control all consumer electronic devices, the inconvenience, a separate remocon corresponding to each device must be used. Therefore, should a driver want to control devices in a vehicle while driving, the driver must turn his head, e.g., toward the center console or dashboard, and manually operate the necessary equipment, thereby causing the driver's attention to be dangerously distracted.

SUMMARY

Embodiments of the present disclosure provide a technology capable of accurately recognizing a motion of a passenger in a vehicle by analyzing a radio signal transmitted and received in a radio signal device in the vehicle.

A system for recognizing motion by analyzing a radio signal according to embodiments of the present disclosure may include: a radio signal transmitter configured to transmit a radio signal; a radio signal receiver configured to receive the transmitted radio signal; and a motion recognition processing device configured to: i) analyze the received radio signal, ii) extract and classify a gesture from the analyzed radio signal, iii) recognize the extracted and classified gesture, and iv) perform vehicle device control based on the recognized gesture.

Also, the motion recognition processing device may include: i) a radio signal analyzer configured to analyze distortion and variation of the radio signal; ii) a gesture extractor configured to extract the gesture of a passenger in a vehicle according to the distortion and variation of the analyzed radio signal; iii) a gesture classifier configured to classify the extracted gesture; and iv) a gesture recognizer configured to recognize a vehicle device control command based on the classified gesture and vehicle information.

When a plurality of passengers are in a vehicle, after previously registering a predefined motion, the motion recognition processing device may be further configured to continuously recognize a motion of a particular passenger among the plurality of passengers performing the predefined motion.

Also, the system may be mounted such that a passenger in a vehicle is positioned between the radio signal transmitter and the radio signal receiver.

Also, the radio signal transmitter may be mounted in a rear seat of the vehicle and the radio signal receiver is mounted in a head unit of the vehicle.

A system for recognizing motion by analyzing a radio signal according to the present disclosure may comprise: a mobile terminal configured to recognize a motion of a passenger in a vehicle and to transmit a motion recognition result; and a motion recognition processing device configured to: i) extract and classify a gesture from the transmitted motion recognition result, ii) recognize the extracted and classified gesture, and iii) perform vehicle device control based on the recognized gesture.

Also, the motion recognition processing device may include: i) a gesture extractor configured to extract the gesture of the passenger from the motion recognition result; ii) a gesture classifier configured to classify the extracted gesture; and iii) a gesture recognizer configured to recognize a vehicle device control command based on the classified gesture and vehicle information.

Also, when a plurality of passengers are in a vehicle, after previously registering a predefined motion, the motion recognition processing device may be further configured to continuously recognize a motion of a particular passenger among the plurality of passengers performing the predefined motion.

A method for recognizing motion by analyzing a radio signal according to the present disclosure may include the steps of: transmitting a radio signal in a vehicle; receiving the transmitted radio signal; analyzing distortion and variation of the received radio signal; extracting and classifying a gesture of a passenger in the vehicle based on the analyzed distortion and variation; and recognizing a vehicle control command based on the extracted and classified gesture.

Also, the method may further include the step of controlling a vehicle device based on the recognized vehicle control command.

A non-transitory computer readable medium containing program instructions for recognizing motion by analyzing a radio signal may include: program instructions that transmit a radio signal in a vehicle; program instructions that receive the transmitted radio signal; program instructions that analyze distortion and variation of the received radio signal; program instructions that extract and classify a gesture of a passenger in the vehicle based on the analyzed distortion and variation; and program instructions that recognize a vehicle control command based on the extracted and classified gesture.

Accordingly, the disclosed embodiments can accurately recognize a motion of a passenger in a vehicle by only transmitting and receiving a radio signal, without the need to install separate hardware in the vehicle.

BRIEF DESCRIPTION OF THE DRAWINGS

The above and other objects, features and advantages of the present disclosure will be more apparent from the following detailed description taken in conjunction with the following accompanying drawings.

DETAILED DESCRIPTION OF THE EMBODIMENTS

Hereinafter, embodiments of the present disclosure will be described with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for recognizing motion of a passenger using a radio signal generated in a vehicle.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

As explained above, the present disclosure discloses techniques for controlling a vehicle device by recognizing motion of a passenger in a vehicle through a distortion or variation analysis. Hereinafter, with reference to FIG. 1 top FIG. 6, embodiments of the present disclosure will be explained in detail.

Figure 1:
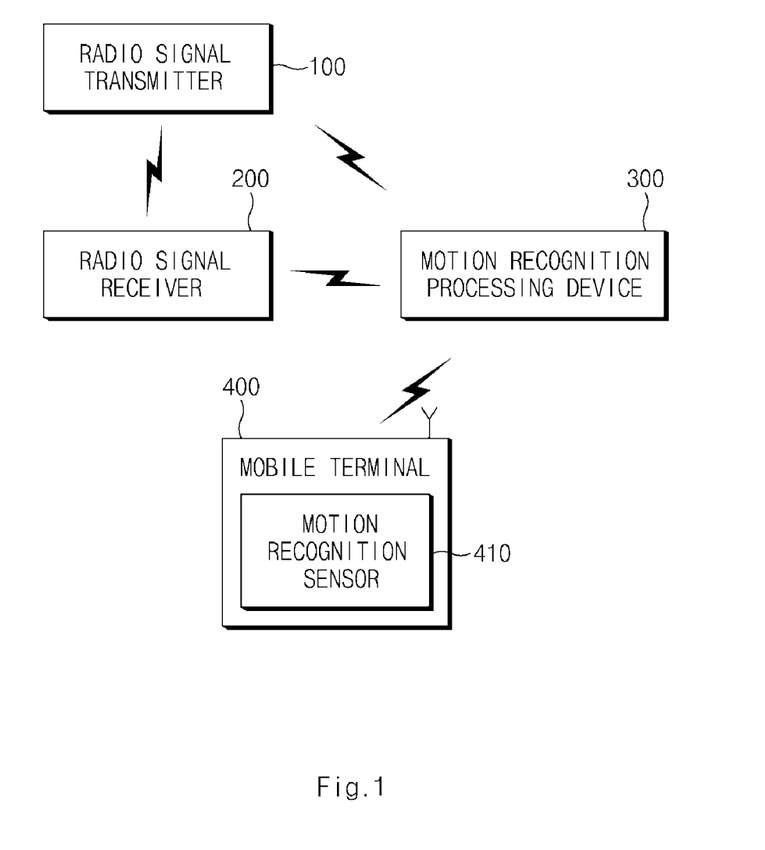
FIG. 1 is a configuration diagram of a system for recognizing a motion by analyzing a radio signal according to embodiments of the present disclosure.

FIG. 1 is a configuration diagram of a system for recognizing a motion by analyzing a radio signal according to embodiments of the present disclosure.

A system for recognizing a motion by analyzing a radio signal according to embodiments of the present disclosure includes a radio signal transmitter 100, a radio signal receiver 200, a motion recognition processing device 300 and a mobile terminal 400. The radio signal transmitter 100 transmits a radio signal, and the radio signal receiver 200 receives a radio signal (e.g., the radio signal transmitted by the radio signal transmitter 100). The motion recognition processing device 300 controls an in-vehicle device by analyzing the radio signal received from the radio signal receiver 200 and identifying the motion of the passenger in the vehicle.

Figure 2:
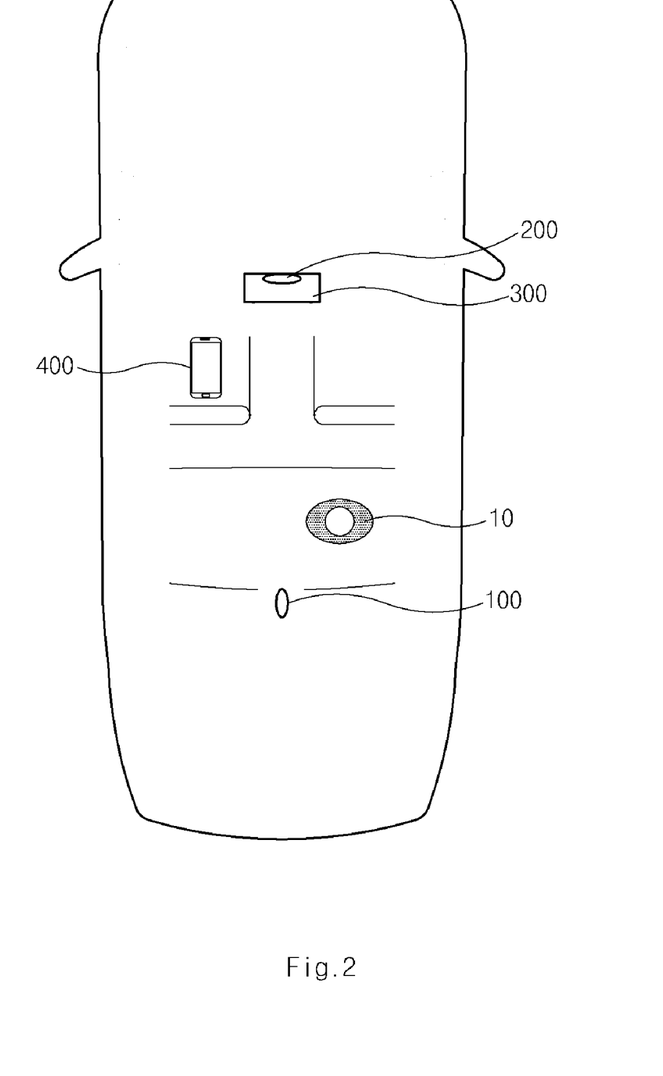
FIG. 2 is an exemplary diagram mounting a system for recognizing a motion by analyzing a radio signal according to embodiments of the present disclosure in a vehicle.

As shown in FIG. 2, the radio signal transmitter 100 may be mounted in the rear in the vehicle, and the radio signal receiver 200 may be mounted in the front in the vehicle. However, the position of the radio signal transmitter 100 and the radio signal receiver 200 is not limited to the rear (e.g., a rear seat or a rear window) and the front (e.g., a center fascia, a head unit, a dash board, etc.), respectively, in the vehicle as shown in FIG. 2. Instead, the radio signal transmitter 100 and radio signal receiver 200 can be mounted anywhere in the vehicle.

Accordingly, if the radio signal transmitted from the radio signal transmitter 100 is varied (e.g., reflected or attenuated) by a passenger 10 and is transmitted to the radio signal receiver 200, the motion recognition processing device 300 recognizes the motion of the passenger depending on the variation of the signal by analyzing the signal transmitted from the radio signal transmitter 100 and the signal received to the radio signal receiver 200. Also, as shown in FIG. 2, a motion can be recognized by using the motion recognition data transmitted from the mobile terminal 400 of the passenger. Notably, the radio signal receiver 200 and the motion recognition processing device 300 may be separately implemented. However, the radio signal receiver 200 and the motion recognition processing device 300 can be instead be constituted as a single module.

The mobile terminal 400 can recognize the motion of the passenger and transmit the motion recognition data to the motion recognition processing device 300 by having a motion recognition sensor 410. The motion recognition sensor 410 may also include a gyroscope and a proximity sensor, as well as other components.

Figure 3:
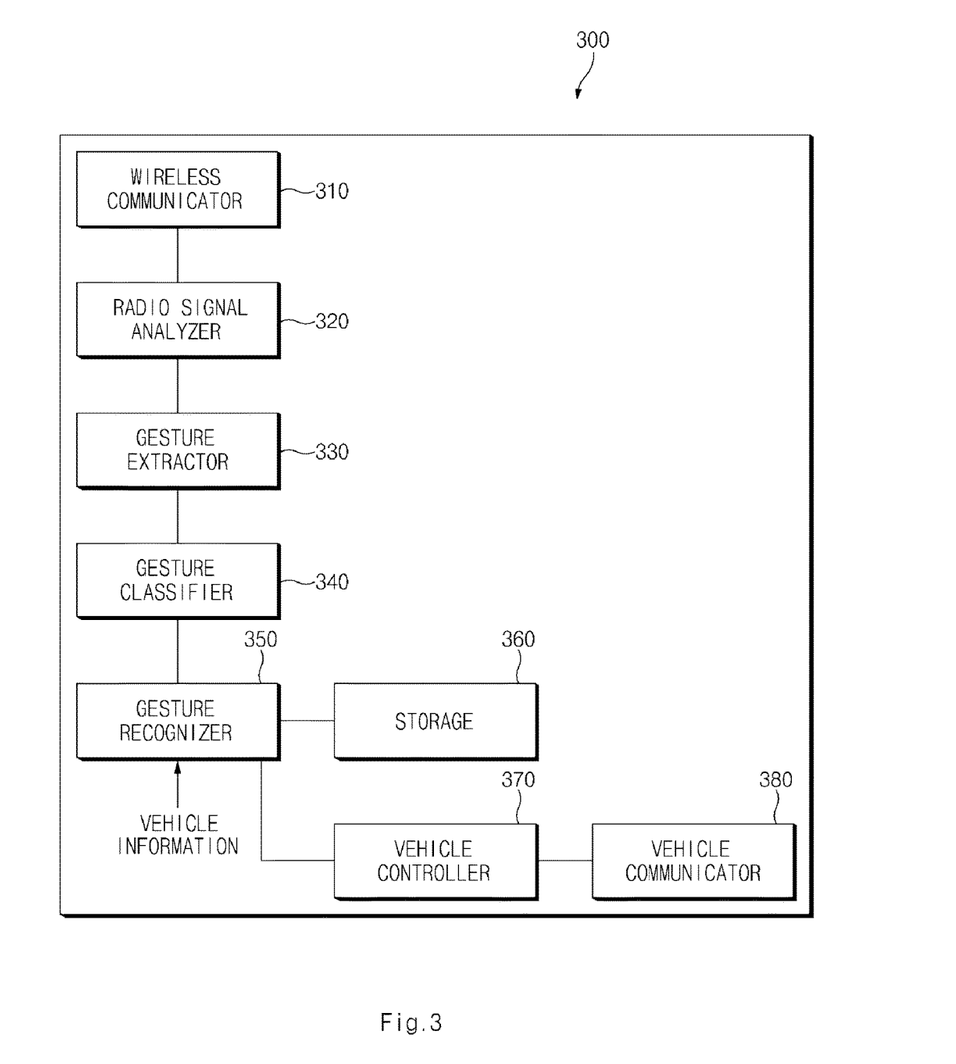
FIG. 3 is a detailed configuration diagram of a motion recognition processing device of FIG. 1.

FIG. 3 shows a detailed configuration of the motion recognition processing apparatus 300 of FIG. 1 and FIG. 2. Referring to FIG. 3, the motion recognition processing device 300 comprises a wireless communicator 310, a radio signal analyzer 320, a gesture extractor 330, a gesture classifier 340, and a gesture recognizer 350, and a storage 360, a vehicle controller 370, and a vehicle communicator 380.

The wireless communicator 310 wirelessly communicates with the radio signal receiver 200 or the mobile terminal 400. The wireless communicator 310 can receive a radio signal through a wireless communication technique, such as, for example, the wireless signal receiver 200, Wi-Fi, Bluetooth, and so forth, and can receive the motion sensor data from the mobile terminal 400.

The wireless signal analyzer 320 analyzes the radio signal received through the wireless communicator 310. That is, the radio signal transmitted from the radio signal transmitter 100 is reflected or attenuated by the body of the passenger and is transmitted to the radio signal receiver 200. Further, the radio signal analyzer 320 measures a variation amount and a signal attenuation amount of the radio signal and can separate signal(s) transmitted from outside of the vehicle from the received signal.

On the other hand, if the motion recognition sensor 410 is mounted in the mobile terminal 400, it may be implemented so that the data measured by the motion sensor is directly transmitted to the gesture extractor 330 without passing the radio signal analyzer 320. The gesture extractor 330 extracts the gesture by converting the variation amount, e.g., using a Doppler effect, based on the analysis result of the received radio signal received from the radio signal analyzer 320, to the gesture. As is known in the art, the Doppler effect is an effect generated when at least one of the wave source and the observer of the wave is moving. Further to this point, if the distance between the wave source and the observer become narrow, the frequency of the wave may increase, whereas if the distance becomes far, the frequency of the wave may decrease. Accordingly, in the present disclosure, the motion of the passenger can be extracted as a gesture according to the variation amount of the frequency of the radio signal.

The gesture classifier 340 analyzes the type of the extracted gesture. For example, it classifies the type of gesture such as "Push," (e.g., the motion which pushes a hand to the outside of a body), "Pull," (e.g., the motion which pulls a hand toward a body), "Dodge," (e.g., the motion which dodges a body to the right and left), "Circle", (e.g., the motion which draws a circle by a hand), "Swipe," (e.g., the motion which swipes a hand to the right and left), etc. The information for the type classification of the gesture can be previously stored in the storage 360.

The gesture recognizer 350 recognizes a vehicle device control command according to the gesture by using the classified gesture and the vehicle information. The matching information of the vehicle device control command for each of gestures can be previously stored in the storage 360, and the gesture recognizer 350 can recognize the vehicle device control command based on the classified gesture and transmit it to the vehicle controller 370. Also, the gesture recognizer 350 can newly define the classified gesture (i.e., when the classified gesture has not previously been classified) and store it to the storage 360 if the control command matched with the classified gesture does not exist in the storage 360.

The vehicle information may include a current state, a vehicle speed, a vehicle device state and the like. For example, if the gesture raising a hand is performed in the "ON" state of an air conditioner, the gesture recognizer 350 may recognize it as the command which raises the intensity of the air conditioner.

The storage 360 matches the vehicle control command for each of gestures and stores it. Also, the storage 360 can store the gesture classification information for each of gestures. For example, a "Push" gesture may be the command which turns up the volume of the audio, a "Pull" gesture may be the command which turns down the volume of the audio, etc. Accordingly, the vehicle control command can be matched for each of the recognized gestures.

The vehicle controller 370 transmits the vehicle control command to the vehicle device (not shown) using the recognition result received from the gesture recognizer 460. The control of the vehicle device (not shown) may include in-vehicle multimedia control, window open/close control, seat position control, audio volume control, broadcast channel control, air conditioning control, display device control and the like.

The vehicle communicator 380 is connected with the in-vehicle device through controller area network (CAN) communication, local interconnect network (LIN) communication, media oriented systems transport (MOST) communication and the like. The present disclosure can further recognize the motion of the passenger by using a radio signal without having a separate operation device and control the in-vehicle device (e.g., audio volume, broadcasting channel, window, seat position, air conditioning controls, etc.) according to the motion recognition result.

Figure 4:
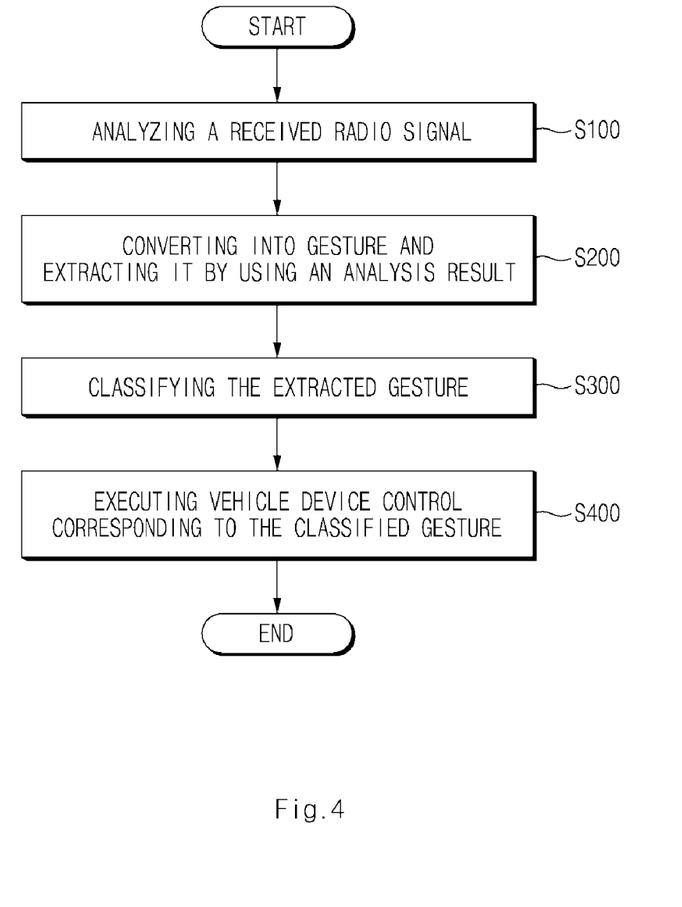
FIG. 4 is a flow chart showing a method for recognizing a motion by analyzing a radio signal according to embodiments of the present disclosure.

Hereinafter, referring to FIG. 4, it is a flow chart showing a method for recognizing a motion by analyzing a radio signal according to embodiments of the present disclosure.

Figure 5:
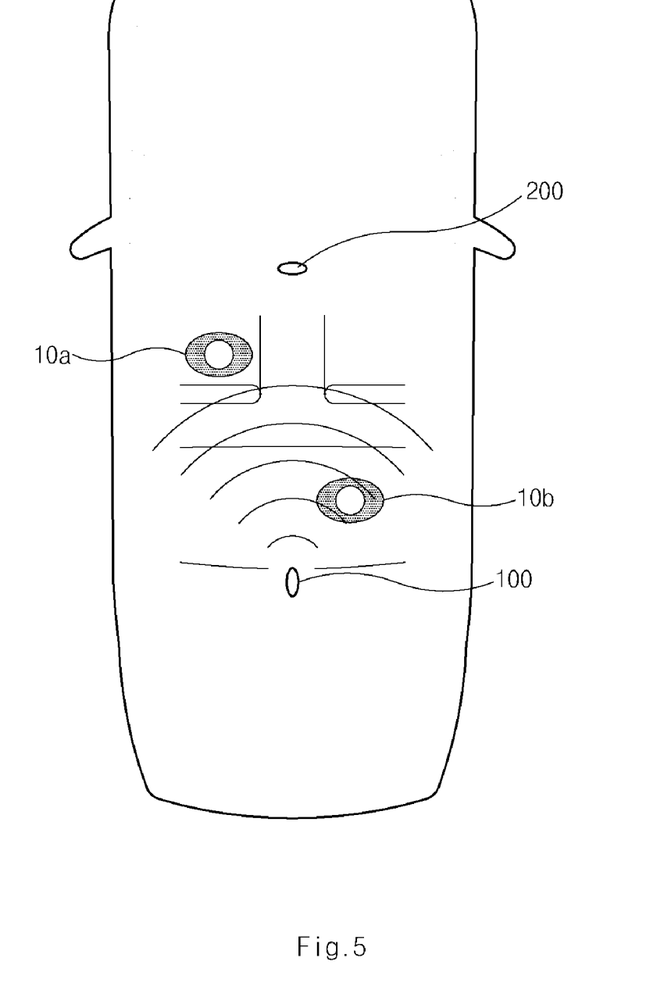
FIG. 5 is a diagram for explaining an example which a radio signal is transmitted according to embodiments of the present disclosure.
Figure 6:
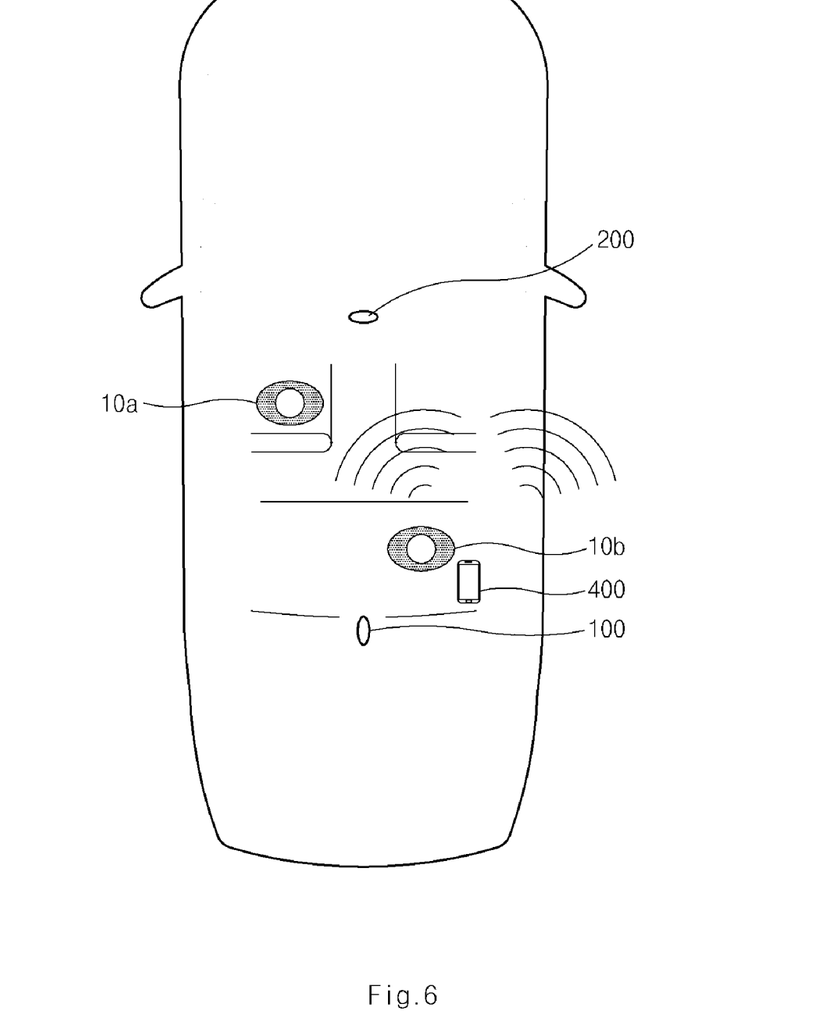
FIG. 6 is a diagram for explaining a radio signal distortion analysis method according to embodiments of the present disclosure.

First, if the radio signal transmitter 100 transmits a radio signal, as shown in FIG. 5, the radio signal reaches to the radio signal receiver 200 through the passengers 10a, 10b. If the radio signal receiver 200 receives the radio signal and transmits it to the motion recognition processing device 300, the radio signal analyzer 320 of the motion recognition processing device 300 analyzes the distortion of the received radio signal (S100). That is, the distortion and variation of the signal such as the attenuation and reflection of the signal, etc. is generated by the motion of the passenger while passing the passenger 10b as shown in FIG. 6, and the radio signal analyzer 320 analyzes the distortion and variation of the signal by detecting the wave change of the radio signal, e.g., based on Doppler effect.

After that, the gesture extractor 330 extracts the gesture from the analysis result (S200). That is, gesture extractor 330 detects the type of the motion from the analysis result which the radio signal analyzer 320 analyzes the wave of the radio signal changed by the motion of the passenger by using Doppler effect. For example, the type of the motion, such as a "Push" of a hand to the outside, etc., is detected.

Subsequently, the gesture classifier 340 classifies the type of the extracted gesture (S300). For example, the gesture pushing a hand to the outside is classified as a "Push" type. Then, the gesture recognizer 350 transmits the vehicle control command signal through the vehicle controller 370 to the vehicle device (not shown) so that the command which the corresponding gesture means is transmitted to the corresponding vehicle device by using the vehicle information and the gesture classification information (S400).

On the other hand, if the mobile terminal 400 having a motion recognition sensor 410 is used (rather than the radio signal receiver 200), the motion recognition sensor 410 can directly measure the motion of the passenger and transmit the measured motion recognition result to the gesture extractor 330. For this, a wireless data channel can be connected between the mobile terminal 400 and the motion recognition processing device 300. After that, the gesture is extracted from the motion recognition result in the gesture extractor 330, and after classifying the extracted gesture in the gesture classifier 340, the control of the vehicle device corresponding to the classified gesture is executed in the gesture recognizer 350.

Also, if multiple passengers exist in the vehicle of the present disclosure, a particular motion can be previously registered in order to recognize a particular passenger. For example, if "X" is registered as the recognition preamble code (i.e., preamble motion) of a particular passenger, only the motion of the passenger who draws "X" and then takes a desired motion among multiple passengers is recognized.

The embodiments of the present disclosure as the above described are for purposes of illustration, through the spirit and scope of the appended claims, various modifications, changes, substitutions and the addition, change, etc. can be made by the ordinary skilled in the art, and it is construed that the following claims includes these modifications, variations, etc.

What is claimed is:

1. A system for recognizing motion by analyzing a radio signal comprising:
   a radio signal transmitter configured to transmit a radio signal;
   a radio signal receiver configured to receive the transmitted radio signal reflected or attenuated by the body of at least one or more passengers; and
   a motion recognition processing device configured to: i) analyze a variation amount and a signal attenuation amount of the received radio signal, ii) extract and classify a gesture according to the variation amount of the frequency of the analyzed radio signal, iii) recognize the extracted and classified gesture, and iv) perform vehicle device control based on the recognized gesture,
   wherein the radio signal transmitter and the radio signal receiver are mounted such that a passenger in a vehicle is positioned between the radio signal transmitter and the radio signal receiver.

2. The system for recognizing motion by analyzing a radio signal according to claim 1, wherein the motion recognition processing device includes: i) a radio signal analyzer configured to analyze distortion and variation of the radio signal reflected or attenuated by the body of at least one or more passengers; ii) a gesture extractor configured to extract the gesture of a passenger in a vehicle according to the analyzed distortion and variation of the radio signal; iii) a gesture classifier configured to classify the extracted gesture; and iv) a gesture recognizer configured to recognize a vehicle device control command based on the classified gesture and vehicle information.

3. The system for recognizing motion by analyzing a radio signal according to claim 1, wherein when a plurality of passengers are in a vehicle, after previously registering a predefined motion, the motion recognition processing device is further configured to continuously recognize a motion of a particular passenger performing the predefined motion among the plurality of passengers.

4. The system for recognizing motion by analyzing a radio signal according to claim 1, wherein the system is mounted such that a passenger in a vehicle is positioned between the radio signal transmitter and the radio signal receiver.

5. The system for recognizing motion by analyzing a radio signal according to claim 4, wherein the radio signal transmitter is mounted in a rear seat of the vehicle, and the radio signal receiver is mounted in a head unit of the vehicle.

6. A method for recognizing motion by analyzing a radio signal comprising the steps of:
   transmitting, by a radio signal transmitter, a radio signal in a vehicle;
   receiving, by a radio signal receiver, the transmitted radio signal reflected or attenuated by the body of at least one or more passengers;
   analyzing, by a motion recognition processing device, distortion and variation of the received radio signal reflected or attenuated by the body of at least one or more passengers;
   extracting, by the motion recognition processing device, and classifying a gesture of a passenger in the vehicle based on the analyzed distortion and variation amount of the frequency of the analyzed radio signal; and
   recognizing, by the motion recognition processing device, a vehicle control command based on the extracted and classified gesture,
   wherein the radio signal transmitter and the radio signal receiver are mounted such that a passenger in a vehicle is positioned between the radio signal transmitter and the radio signal receiver.

7. The method for recognizing motion by analyzing a radio signal according to claim 6, wherein the method further comprises:
   controlling, a motion recognition processing device, a vehicle device based on the recognized vehicle control command.

8. A non-transitory computer readable medium containing program instructions for recognizing motion by analyzing a radio signal, the computer readable medium comprising:
   program instructions that transmit a radio signal in a vehicle;
   program instructions that receive the transmitted radio signal reflected or attenuated by the body of at least one or more passengers;
   program instructions that analyze distortion and variation of the received radio signal reflected or attenuated by the body of at least one or more passengers;
   program instructions that extract and classify a gesture of a passenger in the vehicle based on the analyzed distortion and variation amount of the frequency of the analyzed radio signal; and
   program instructions that recognize a vehicle control command based on the extracted and classified gesture.

* * * * *